Figure 1:
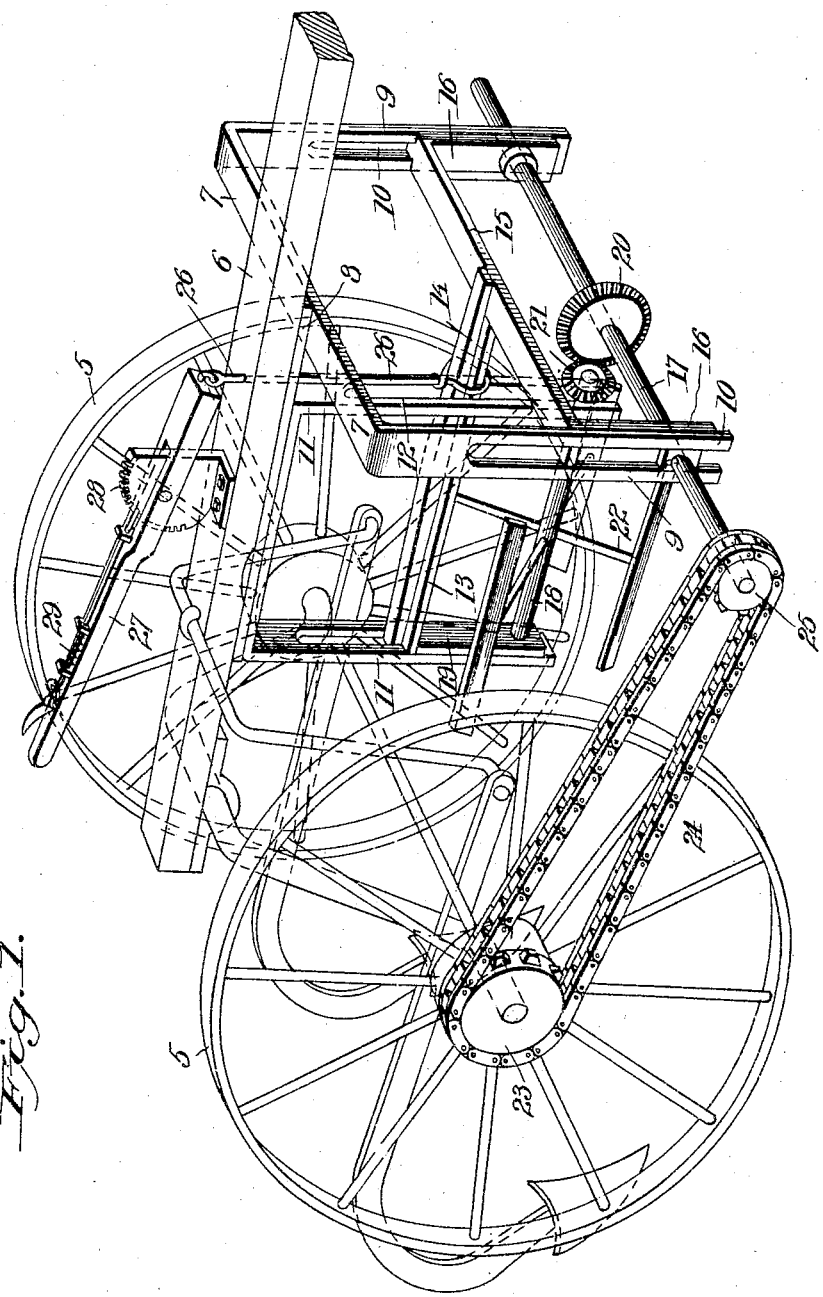

No. 774,809. PATENTED NOV. 15, 1904.
G. WILLIS.
COTTON ATTACHMENT FOR CULTIVATORS.
APPLICATION FILED APR. 28, 1904.
NO MODEL. 2 SHEETS—SHEET 1.

WITNESSES:
C. H. Walker
M. A. Schmidt

INVENTOR
George Willis
By Milo B. Stevens and Co.
Attorneys

No. 774,809. PATENTED NOV. 15, 1904.
G. WILLIS.
COTTON ATTACHMENT FOR CULTIVATORS.
APPLICATION FILED APR. 28, 1904.
NO MODEL. 2 SHEETS—SHEET 2.
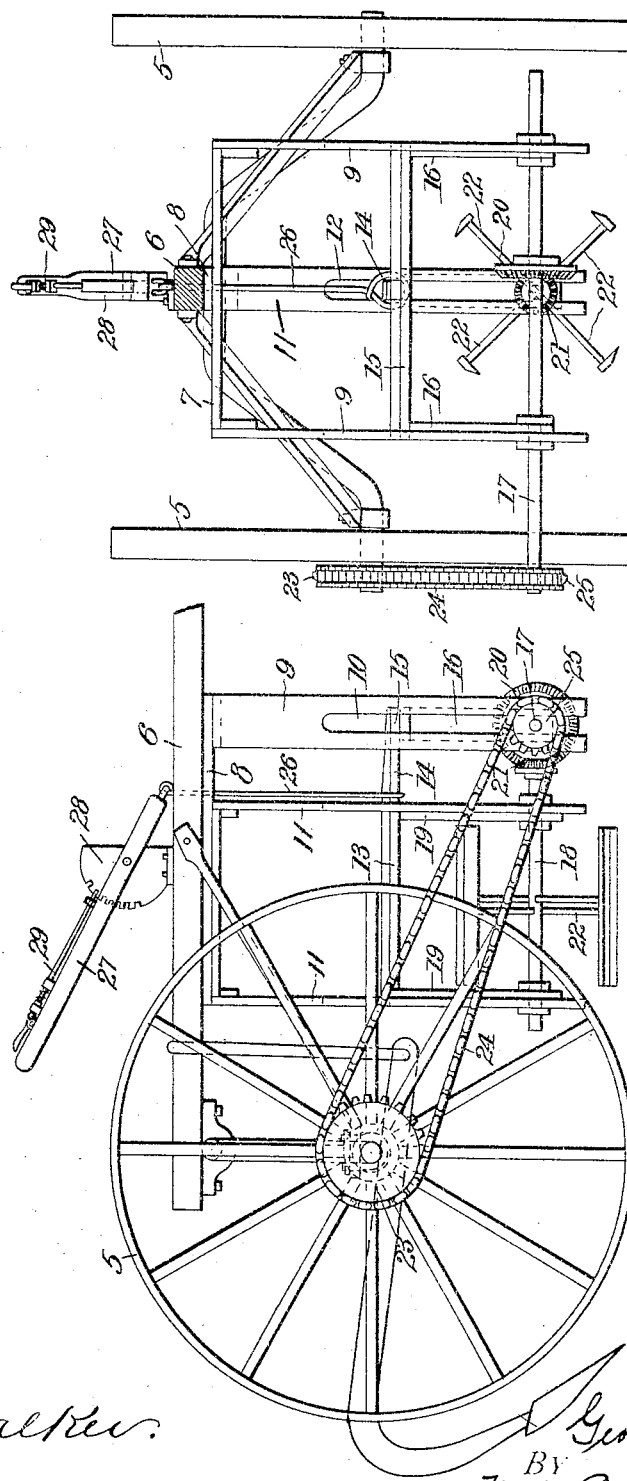
WITNESSES:
C. M. Walker.
M. A. Schmidt
INVENTOR
George Willis,
BY
Milo B. Stevens and Co.
Attorneys No. 774,809.

Patented November 15, 1904.

UNITED STATES PATENT OFFICE.

GEORGE WILLIS, OF NEAR HICO, TEXAS.

COTTON ATTACHMENT FOR CULTIVATORS.

SPECIFICATION forming part of Letters Patent No. 774,809, dated November 15, 1904.

Application filed April 28, 1904. Serial No. 205,356. (No model.)

*To all whom it may concern:*

Be it known that I, GEORGE WILLIS, a citizen of the United States, residing near Hico, in the county of Hamilton and State of Texas, have invented new and useful Improvements in Cotton-Chopper Attachments for Cultivators, of which the following is a specification.

My invention relates to a cotton-chopper attachment for cultivators, and has for its object an attachment which can be readily applied to any ordinary cultivator and which shall be simple in construction and efficient in operation.

The invention consists in certain novel features of construction hereinafter described and claimed, and shown in the appended drawings, forming part hereof, in which—

Figure 1 is a perspective view of a cultivator provided with the attachment. Fig. 2 is a side elevation, and Fig. 3 a front end elevation, thereof.

Referring specifically to the drawings, 5 denotes the ground-wheels of an ordinary cultivator, and 6 the draft tongue or pole.

The frame for supporting the cotton-chopper mechanism comprises a horizontal cross-beam 7, which extends transversely under the tongue, being secured thereto in any suitable manner, and a beam 8, which extends rearwardly from the cross-beam and is also fastened under the tongue. The cross-beam has at its ends downwardly-extending vertical branches 9, which are slotted longitudinally, as at 10, and the beam 8 has similar branches 11, they being also slotted, as at 12.

At 13 is designated a cross-head which extends between the branches 11 and through the slots therein. It has at its front end an extension 14, which carries a cross-head 15, extending at right angles thereto between the branches 9 and through the slots therein. The cross-head 15 carries hangers 16, in which a shaft 17 is journaled, and a shaft 18 at right angles to this shaft is journaled in hangers 19, depending from the cross-head 13. The shaft 17 is the drive-shaft and has a bevel-gear 20, which is in mesh with a bevel-pinion 21 on the shaft 18. The last-mentioned shaft carries the chopper-blades or hoes, being secured to the outer ends of stems 22, extending radially from the shaft. I have shown four blades; but their number is immaterial and may be varied to suit local conditions.

A sprocket 23 is secured to the hub of one of the ground-wheels and is connected by a chain 24 with a sprocket 25 on the drive-shaft 17. Motion from the ground-wheel will be imparted to said shaft by the sprocket and chain, and the bevel-gear 20, which meshes with the bevel-pinion 21, will rotate the shaft 18, whereby the chopper-blades will be operated.

At 26 is indicated a rod which is fastened at one end to the cross-head 13 and extends through the cultivator-tongue, having its other end fastened to a hand-lever 27, which is fulcrumed to a segmental rack 28 on the tongue. For locking the hand-lever the usual spring-latch 29 is provided. By means of the hand-lever and its connections, as described, the cross-heads 13 and 15, which carry the drive and chopper shafts, can be lowered or raised, they being slidably mounted in the slots of the branches 9 and 11, respectively. This will throw the chopper into or out of operation and also enables it to be properly adjusted to suit the plants and the ground.

The parts above described are few and simple and enable the attachment to be readily applied to any ordinary cultivator.

Having thus described my invention, what is claimed as new, and desired to be secured by Letters Patent, is—

The combination with a cultivator, of a cross-beam secured to and extending transversely under the tongue, and having a rearward extension; slotted vertical branches extending downwardly from the cross-beam and the extension; cross-heads arranged at right angles to each other and mounted in the slotted branches and vertically adjustable therein; a drive-shaft carried by one of the cross-heads; a chopper-shaft carried by the other cross-head and geared to the drive-shaft; a driving connection between the cultivator-wheel and the drive-shaft; and a hand-lever for adjusting the cross-heads.

In testimony whereof I have signed my name to this specification in the presence of two subscribing witnesses.

GEORGE WILLIS.

Witnesses:
A. L. PHILLIPS,
J. W. NEWSOM.